United States Patent [19]
Franco

[11] 3,955,327
[45] May 11, 1976

[54] GEAR POLISHING
[75] Inventor: Melvin A. Franco, Detroit, Mich.
[73] Assignee: Lear Siegler, Inc., Santa Monica, Calif.
[22] Filed: Dec. 21, 1972
[21] Appl. No.: 317,109

[52] U.S. Cl. ............................... 51/206 R; 51/287
[51] Int. Cl.² ...................................... E05D 15/40
[58] Field of Search ............. 51/206 R, 287, 206 P, 51/317, 204

[56] References Cited
UNITED STATES PATENTS

| | | | |
|---|---|---|---|
| 2,732,669 | 1/1956 | Conley | 51/325 |
| 3,085,369 | 4/1963 | Findley | 51/287 |
| 3,183,633 | 5/1965 | Decker | 51/206 R |
| 3,252,775 | 5/1966 | Tocci-Guilbert | 51/295 |
| 3,708,925 | 1/1973 | Ainoura | 51/287 |

OTHER PUBLICATIONS
Hafer, C. H. *Toner Brick Grinder*, I.B.M. Technical Disclosure Bulletin, Vol. 12, No. 6, p. 777, (Nov. 1969).

*Primary Examiner*—Al Lawrence Smith
*Assistant Examiner*—Robert C. Watson
*Attorney, Agent, or Firm*—Whittemore, Hulbert & Belknap

[57] ABSTRACT

A gear shaped tool formed of a relatively soft elastically deformable material provided with a multiplicity of pores provided in the sides of its teeth by elimination of solid particles exposed at the surface thereof is rotated in mesh under light pressure contact with a work gear, while a very fine abrasive fluid polishing compound is provided. The operation improves the surface finish of the teeth of the work pieces without appreciably affecting the tooth form. The operation may be carried out with the axes of the gear and polishing tool parallel or crossed at a small angle and a relative traverse may be provided between the gear and tool in a direction which occupies a plane parallel to the axes of both the gear and tool, such direction preferably being parallel to the axis of the gear.

27 Claims, 3 Drawing Figures

GEAR POLISHING

BRIEF SUMMARY OF THE INVENTION

In the past final finishing operations have been provided on gear teeth, both to modify or improve the tooth form and to improve the surface finish.

One method of finishing gear teeth in wide spread commercial use is a gear shaving operation in which the gear is rotated in mesh with a gear-like tool provided with cutting edges extending up and down the sides of the teeth parallel to the plane of rotation thereof. The operation is accompanied by a relative traverse between the gear and shaving cutter in a plane parallel to the axes of both the gear and cutter. Where this direction of traverse is parallel to the axis of the gear, it serves to distribute the shaving action of the shaving cutter uniformly over the teeth of the gear from end to end thereof. Where the relative traverse extends in a direction oblique to the axes of both the gear and tool, it serves the additional purpose of shifting the zone of deepest penetration longitudinally of the teeth of the shaving cutter and in addition, permits the shaving action to be distributed from end to end of the gear teeth with a traverse stroke shorter than the width of the gear.

This gear shaving operation is applied to the teeth of steel gears prior to heat treatment and in most cases the gears after heat treatment are ready for use.

Another method of finishing the teeth of a work gear which both improves surface finish and produces a required tooth form thereto is a gear grinding operation. This normally is applied to the teeth of the gear after heat treatment and constitutes a final finishing operation.

A third final finishing operation provided on gear teeth is a honing operation in which the gear is rotated in mesh with a gear-like honing tool, the portions of the tool at the sides of the teeth being formed of a relatively hard but slightly yieldable and highly resilient plastic material such for example as a suitable epoxy resin. The operation is carried out by rotating the honing tool in mesh with the gear and at the same time providing a traverse stroke parallel to the axis of the gear in order to distribute the finishing action of the hone uniformly from end to end of the gear teeth.

None of these methods is capable of simply improving the surface finish of the teeth of the gear without affecting its tooth form. Honing tools may be produced capable of providing a 10–12 micro inch surface finish and when new, these hones will produce substantially the exact tooth profile required. However, in use on a series of gears, these hones quickly conform themselves to the profile on the gear teeth and are thus incapable of providing tooth form correction.

The present invention employs a gear-shaped tool formed of a relatively soft yieldable resilient material provided with a multiplicity of pores in the tooth surfaces. The tool is rotated in mesh with a gear, preferably at crossed axes, while a fine abrasive polishing compound is provided on the tooth surfaces. Either the gear or the tool is positively driven in rotation and drives the other as a consequence of their meshed relationship. During the rotation of the gear and tool a relative traverse is provided, preferably in a direction parallel to the axis of the gear. It has been found that this operation is capable of improving the surface finish to 5–6 micro inches and this is accomplished without in any way changing the profile of the gear teeth. Moreover, it is found that this improvement in surface finish may be provided on the teeth of the gear in approximately half the time previously required for the most accurate and effective honing operation.

DETAILED DESCRIPTION

Figure 2:
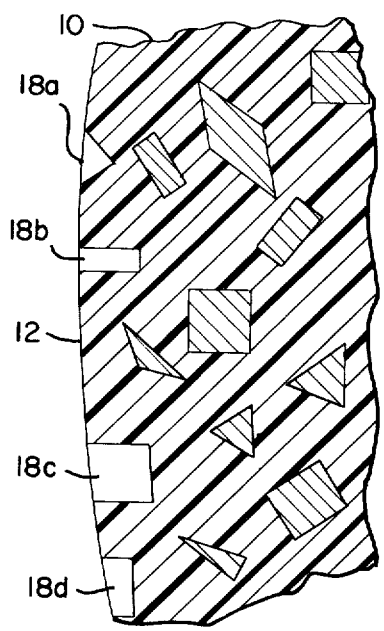
FIG. 2 is an enlarged fragmentary section of the polishing material illustrating the particles removed at the polishing surface.
Figure 1:
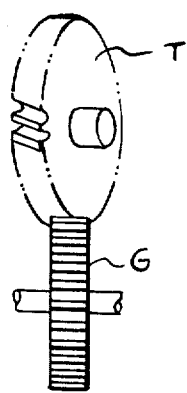
FIG. 1 is an elevational view showing the relationship between a polishing tool and gear according to the present invention.

In accordance with the present invention a work gear G is brought into mesh with a gear-like polishing tool T with the axes of the gear and tool crossed as indicated in the Figure. The angle between the axes of the gear and tool is preferably between 3° and 20° depending upon other factors influencing the polishing operation.

The polishing operation may be carried out on crossed axes gear honing machines such for example as illustrated and described in Praeg U.S. Pat. No. 3,054,225.

During the polishing operation a liquid polishing compound containing very fine abrasive particles such for example as a 500 grit lapping compound is supplied to the periphery of one of the members, preferably the polishing tool, and is carried on the teeth of the members around the zone of mesh where the polishing action is obtained as a result of the sliding contact between the teeth of the gear and polishing tool.

The polishing tool is driven in rotation at a substantial speed as for example 240 RPM, giving rise to a peripheral speed of approximately 520 feet per minute. It will of course be understood that this does not represent the velocity of the sliding action between engaged surface areas of the teeth of the tool and gear since this sliding action occurs at a much lower velocity.

Moreover, the specific sliding action between the teeth of the polishing tool and the work is made up of two components. The first of these may be considered as involute slide in the plane of rotation of the gear. This sliding action is in opposite directions at opposite sides of the pitch line, is of zero magnitude at the pitch line, and is in specifically opposite directions on opposite sides of the teeth. This by itself would give rise to a polishing action which was of maximum effectiveness adjacent the roots and crests of the teeth and fell off to a minimum effectiveness at the pitch line.

The other component of the specific sliding action may be referred to as the crossed axes slide and takes place in a direction longitudinally or between the ends of the teeth. This specific sliding action is substantially uniform throughout the entire tooth surface. The resultant of these two sliding actions, while of reduced magnitude adjacent the pitch line, is highly effective over the entire surface of the gear teeth.

Referring again to the Figure, it will be observed that the teeth of the gear as shown are spur and accordingly, the teeth of the polishing tool are helical and extend in a direction and at an angle determined by the angle between the axes of the gear and tool. It will of course be apparent that by a selection of proper hand and helix for the teeth of the polishing tool, the operation may be applied to helical gears of either hand.

In the polishing operation, the physical characteristics of the polishing tool are critical. If the material of the polishing tool were relatively hard, the operation would tend to modify tooth profiles on the gear into conformity with the teeth of the polishing tool. In the present operation this is not permissible since the teeth of the gear will have been brought to exactly the desired profile, usually by expensive carefully conducted grinding or honing operations. The present method is for the sole purpose of improving surface finish without in any way modifying the previously produced high accuracy of the teeth of the gear.

In order that the operation shall be carried out as contemplated herein, the material of the polishing tool is required to be sufficiently soft so that it conforms itself with substantial uniformity to the surface of the teeth of the gear and hence, will perform only as a surface polishing operation which is uniform throughout the entire surface.

For this purpose, excellent results have been obtained when the polishing tool is produced from a resiliently yieldable material having a Durometer A hardness of about 95. Excellent results have been obtained employing a polyurethane adapted to cure at room temperature. Such a material is sold under the trade name "Flexane" manufactured by Devcon Corporation of Danvers, Massachusetts. This produces a tool in which the teeth are readily deflected by hand and this softness of the material permits the teeth of the polishing tool to conform themselves substantially uniformly to the teeth of the work gear so as to produce the polishing without any change in form.

This is particularly important in many applications. For example, certain aviation gears have a relatively sharp break in the involute at or adjacent the pitch line which is important in the operation of the gearing. If gears of this type were honed in accordance with prior known honing practices, the relatively abrupt change in involute would be modified to a zone in which one blends into the other. However, when such gears are polished in accordance with the present invention, the relatively sharp break in involute remains after polishing.

Another critical physical characteristic of the polishing tool is that the working surfaces of its teeth are provided with a multiplicity of pores of somewhat different sizes. As the polishing compound, containing extremely fine abrasive particles, is applied to the surfaces of the teeth of the tool, this compound enters or is forced into the pores and remains therein as a tooth passes from the zone of mesh through 360° of rotation and again enters into mesh. At this time, due to the softness and compressibility of the hone material some of the polishing compound is forced out of the pores and flows over the active surface of the teeth of the polishing tool where the particles are effective in producing the improvement in surface finish.

Excellent results have been obtained in providing pores in the relatively soft polishing tool by incorporating common table salt into the polyurethane before it is shaped into gear form and allowing it to cure. The salt is substantially inert and remains embedded in the cured material of the tool. The particles which are exposed or located just within the surface of the teeth of the polishing tool are eliminated during initial rolling of the polishing tool with a gear, leaving pores in the working surface of the teeth of the polishing tool whose dimensions are determined by the particle size of the salt.

The specific physical characteristics of the material from which the polishing tool is made will be determined to some extent by the specific physical properties of the gear whose teeth are to be polished by the tool. Reference was previously made to a tool formed of polyurethane having a Durometer A hardness of 95. The variation in hardness may be considered to be limited at the upper limit by a hardness of material which tends to produce a change in form of the teeth of the work gear. At the lower end, the hardness may be considered to be determined by that which results in an unacceptable reduction in the polishing action. It will be understood that the hardness determines the ability of the material to be distorted from its initial shape so as to conform to the surface configuration of the gear teeth. It is important however, to note that the material has a sufficiently high resilience so that after distortion as a tooth of the polishing tool passes through the zone of mesh, it completely recovers its initial shape.

A specific polishing tool was produced from a mixture of four parts of the polyurethane, specifically Flexane 95; one part of the curing agent supplied by Devcon Corporation for this particular urethane which causes it to cure at room temperature; and two parts of plain granulated table salt. This salt has been analyzed and it is found that approximately 54% of the particles exceed 35–40 mesh, 35% exceed 50 mesh, and approximately 6% exceed 60 mesh. The remainder, or approximately 5%, have a particle size of less than 60 mesh. Table salt is chemically inert in the defined environment, is frangible, and soluble, and hence readily eliminated where particles are exposed at a working surface, but which particles remain embedded except at the surface portions of the body.

Figure 3:
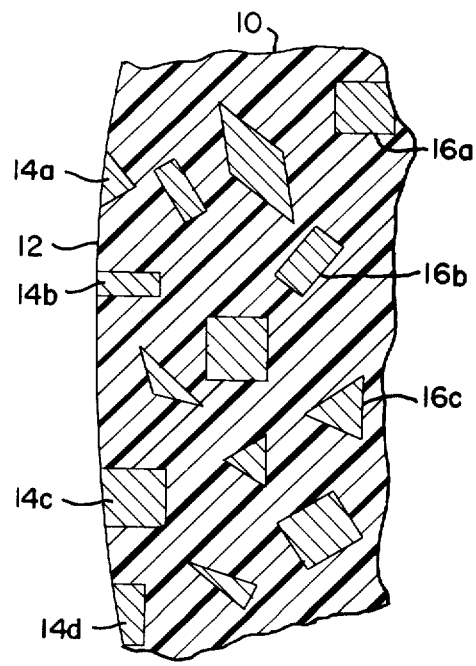
FIG. 3 is a fragmentary sectional view similar to FIG. 2, illustrating the particles at the surface in position prior to removal.

In FIG. 3 there is illustrated a portion of the polishing material 10 having a polishing surface 12 at which a number of solid particles 14a, 14b, 14c, and 14d are exposed. Within the material the particles illustrated at 16a, 16b, 16c, etc. are embedded so that the material is essentially a solid material devoid of pores or openings.

In FIG. 2 the polishing material 10 is illustrated in the same manner as in FIG. 3 except that the particles 14a through 14d initially exposed at a polishing surface 12, have been removed, leaving pores 18a, 18b, 18c and 18d.

Since common table salt crystals are esentially cubic, the sections of these cubical crystals have the shapes illustrated in FIGS. 2 and 3.

Since approximately two parts of the particles are provided for each five parts of the resin and curing agent, the relationship between areas in a sectional plane occupied by particles and areas occupied by the highly resilient yieldable polymeric material are approximately as shown. It will be appreciated that particles such as the salt particles may be of different sizes and sections thereof may be oblique so that in the cross-sectional views of FIGS. 2 and 3, the particles and the pores left by removal of the particles, may have the shapes as illustrated, as well as pentagonal, hexagonal, and scalene triangular shapes.

Since the urethane as disclosed herein is a liquid prior to curing, the salt particles are completely surrounded with the result that the mixture of the resin and salt particles constitutes a solid continuum characterized by the complete absence of any voids therein.

In practice, these components are thoroughly mixed and are placed in a mold having the precise shape of the polishing tool to be produced. If desired, a central core may be placed in the mold so that only the peripheral toothed portion of the tool need be formed of the polyurethane material. This material, as indicated above, cures at room temperature and it is only necessary to leave the material in the mold until the cure at room temperature has been completed. At this time the polishing tool is pressed out of the mold and is ready for use although if desired, it may be given a preliminary treatment by rolling it in mesh with a gear having the characteristics for which the gear polishing tool is designed. This will eliminate the salt particles at and adjacent the working surfaces of the teeth and will leave a multiplicity of pores exposed therein.

In use the polishing tool is positioned in tight mesh with the gear to be polished, the axes of the gear and tool being crossed at an appropriate angle as for example 18°. Since the material of the polishing tool is relatively soft, the actual working pressure during the polishing operation is determined by the separation between the axes of the polishing tool and the gear and this will be such as to cause a measurable deformation of the teeth of the polishing tool in the zone of contact.

In a successful practice of the present invention the polishing tool had a diameter of about 9 inches and was driven in mesh with the work gear at 240 RPM. During this time a relative traverse between the polishing tool and the gear in the direction of the axis of the gear was provided at a rate of about 3 inches per minute, this traverse being a back and forth reciprocation sufficient to cause the common normal to the axes of the gear and polishing tool to pass substantially from one side of the gear to the other, so as to insure uniform polishing action of the teeth from end to end. During the polishing operation a fluid polishing compound containing particles not exceeding 500 grit was employed.

The gear on which the polishing operation was performed had previously been honed by rotation in mesh with a relatively hard but slightly yieldable and resilient honing tool so as to produce precisely the required tooth profile. This tooth profile included separate addendum and dedendum portions intersecting adjacent the pitch line with a relatively abrupt change in involute profile. The surface finish of this gear as honed was approximately 11–12 micro inch, which represents about the finest surface finish obtainable by a honing operation, which is superior to a surface finish attainable with conventional grinding.

Following the polishing operation the gear was checked and there was no perceptible stock removal, nor was there any perceptible or measurable alteration in the tooth profile, including the relatively sharp break between portions of different involute. However, the surface finish was found to have been reduced to a 5–6 micro inch finish.

While the invention as so far described has been carried out at crossed axes, using a reciprocatory traverse in a direction parallel to the axis of the gear, the invention may be successfully practiced with variations as noted below:

While the polshing operation has been carried out successfully as noted above, employing a polishing compound having polishing grains or particles of a size not exceeding 500 mesh, the polishing compound may contain polishing solids all of which are of substantially smaller size. Such a compound for example may contain jewelers' rouge or yellow aluminum oxide particles. In general, the time required for the operation may be reduced by employing as large particle size in the polishing compound as are found to be capable of producing the required surface finish.

The method as previously described employed a polishing tool having a helix angle different from that of the work gear, so that the gear and tool when brought into mesh had their axes crossed in space. This crossed axes relationship makes it necessary or at least desirable to provide a back and forth reciprocation to distribute the finishing action uniformly over the teeth from end to end. Since the polishing tool is relatively soft and yieldable, substantially uniform contact may be produced from end to end of the gear teeth if the crossed axes angle is relatively smaller as for example less than 10°, or in some cases less than 5°. Where this small crossed axes is employed, it is possible to eliminate the traverse and thus to shorten the time cycle. Even at these small crossed axes there is a substantial sliding action in a direction parallel to the length of the teeth.

In some cases it is satisfactory to design the polishing tool so that it has the same helix angle as the gear and of opposite hand (where helical) so that the axes of the gear and tool during the polishing operation are parallel. With this arrangement no relative traverse is required to distribute the polishing action uniformly from end to end of the gear teeth and it is possible to carry out the operation without any reciprocation. It is appreciated that this method produces a minimum of polishing action at the pitch line and accordingly, it is not suitable for all applications. However, where the axes of the gear and tool are parallel, it is possible to superimpose upon the rotation a reciprocation between the gear and tool which may be parallel to the gear axis, parallel to the tool axis, or in a direction lying between these directions. This reciprocation will have the effect of providing a longitudinal sliding action between the teeth of the gear and tool at the pitch line and preferably is carried out at substantial speeds as for example at least several inches a second.

In practice, either the gear or the polishing tool is positively driven in rotation and the other part is driven solely through its meshed engagement.

In some cases the operation may be completed with rotation of the gear and tool in a single direction. In other cases where it is required to produce identical finish at opposite sides of the teeth it may be necessary to provide a first rotation in one direction and then a second rotation in the opposite direction.

Depending upon the particular method selected, including the crossed axes angle if any, the hardness of the yieldable resilient material of the polishing tool may be substantially varied. Thus, where a small crossed axes is employed without relative traverse, it is desirable to employ a softer material so that the pressure contact between surface portions of the teeth of the tool and gear may be substantially uniform from end to end of the teeth of the gear. In general, the material of the polishing tool should have a Durometer A hardness of at least 75 and should not exceed a Durometer D hardness of about 55 (Rockwell R 50). It is to be understood that these values of hardness are combined with an elasticity or resilience sufficient to permit complete recovery to initial form after distortion as the teeth of the polishing tool pass through the zone of mesh.

The porosity of the yieldable material may of course be substantially varied but the solid particles added to the fluid polymeric material before curing should be at least one part in ten, by volume, and as above-described, two parts in seven has proved to be very successful.

I claim:

1. A polishing tool for use with a polishing compound having polishing particles therein the majority of which are substantially smaller than 50 mesh, said tool comprising a body having at least a portion thereof having a polishing surface, said body portion being formed essentially of a relatively soft or yieldable highly resilient solid material characterized by the fact that the material is in the form of a solid continuum having a multiplicity of discrete solid particles of at least 50 mesh particle size uniformly distributed therein and the complete absence of voids therein and being devoid of abrasive grit bonded to the surface thereof, said material having a hardness of between 75 Durometer A and 55 Durometer D, the polishing surface of said body having a multiplicity of pores or recesses opening into said polishing surface and extending into the material of said body portion, said pores resulting from the elimination of the discrete solid particles from the surface, the majority of said pores or recesses conforming in size to particles of 50 mesh or larger to provide for physical reception therein of particles of polishing compound.

2. A tool as defined in claim 1 in which said material has a hardness of about 95 Durometer A.

3. A tool as defined in claim 1 in which said elastomeric material is polyurethane.

4. A tool as defined in claim 2 in which said material is polyurethane.

5. A polishing tool as defined in claim 1 in which said body is in the form of a gear, and the polishing surface thereof is composed of the side surfaces of the gear teeth.

6. A tool as defined in claim 5 in which said material has a hardness of about 95 Durometer A.

7. A tool as defined in claim 5 in which said material is polyurethane.

8. A tool as defined in claim 6 in which said material is polyurethane.

9. A polishing tool for use with a polishing compound having polishing particles therein most of which are substantially smaller than 50 mesh, said tool comprising a body having at least a portion thereof having polishing surface portions, said body portion being formed of a relatively soft or yieldable highly resilient material having a hardness of between 75 Durometer A and 55 Durometer D, said material having a multiplicity of discrete solid particles of at least 50 mesh particle size uniformly distributed therein of which a multiplicity are located at said polishing surface portions, said resilient material and particles together forming a solid continuum characterized by the complete absence of voids therein, said particles being formed of a material such that when said polishing surface portions slide in pressure contact against a surface of a work piece the particles located at the polishing surface portions are eliminated and leave pores or recesses of corresponding size in open communication with said polishing surface portions and extending into said material therefrom.

10. A tool as defined in claim 9 in which said resilient material is polyurethane resin.

11. A tool as defined in claim 9 in which said particles are salt crystals.

12. A tool as defined in claim 10 in which said particles are salt crystals.

13. A tool as defined in claim 9 in which said material has a hardness of about 95 Durometer A.

14. A tool as defined in claim 10 in which said material has a hardness of about 95 Durometer A.

15. A tool is defined in claim 11 in which said material has a hardness of about 95 Durometer A.

16. A tool as defined in claim 12 in which said material has a hardness of about 95 Durometer A.

17. A tool as defined in claim 9 in which said particles constitute at least 10% by volume of said body portion.

18. A tool as defined in claim 9 in which said tool is in the form of a gear body and the portion thereof having polishing surface portions is the tooth portion thereof.

19. A tool as defined in claim 18 in which said resilient material is polyurethane.

20. A tool as defined in claim 18, said particles being salt crystals.

21. A tool as defined in claim 19, said particles being salt crystals.

22. A tool as defined in claim 18, in which the resilient material has a hardness of about 95 Durometer A.

23. A tool as defined in claim 19, in which the resilient material has a hardness of about 95 Durometer A.

24. A tool as defined in claim 20 in which the resilient material has a hardness of about 95 Durometer A.

25. A tool as defined in claim 21 in which the resilient material has a hardness of about 95 Durometer A.

26. A tool as defined in claim 22 in which the resilient material has a hardness of about 95 Durometer A.

27. A tool as defined in claim 18 in which said particles constitute at least 10% by volume of said body portion.

* * * * *